INVENTOR
John F. Reuther
BY Edward F. Poosissky
ATTORNEY

Nov. 17, 1970 — J. F. REUTHER — 3,541,544
DIGITAL POTENTIOMETER AND CONTROL THEREFOR
Filed Aug. 19, 1966 — 5 Sheets-Sheet 2

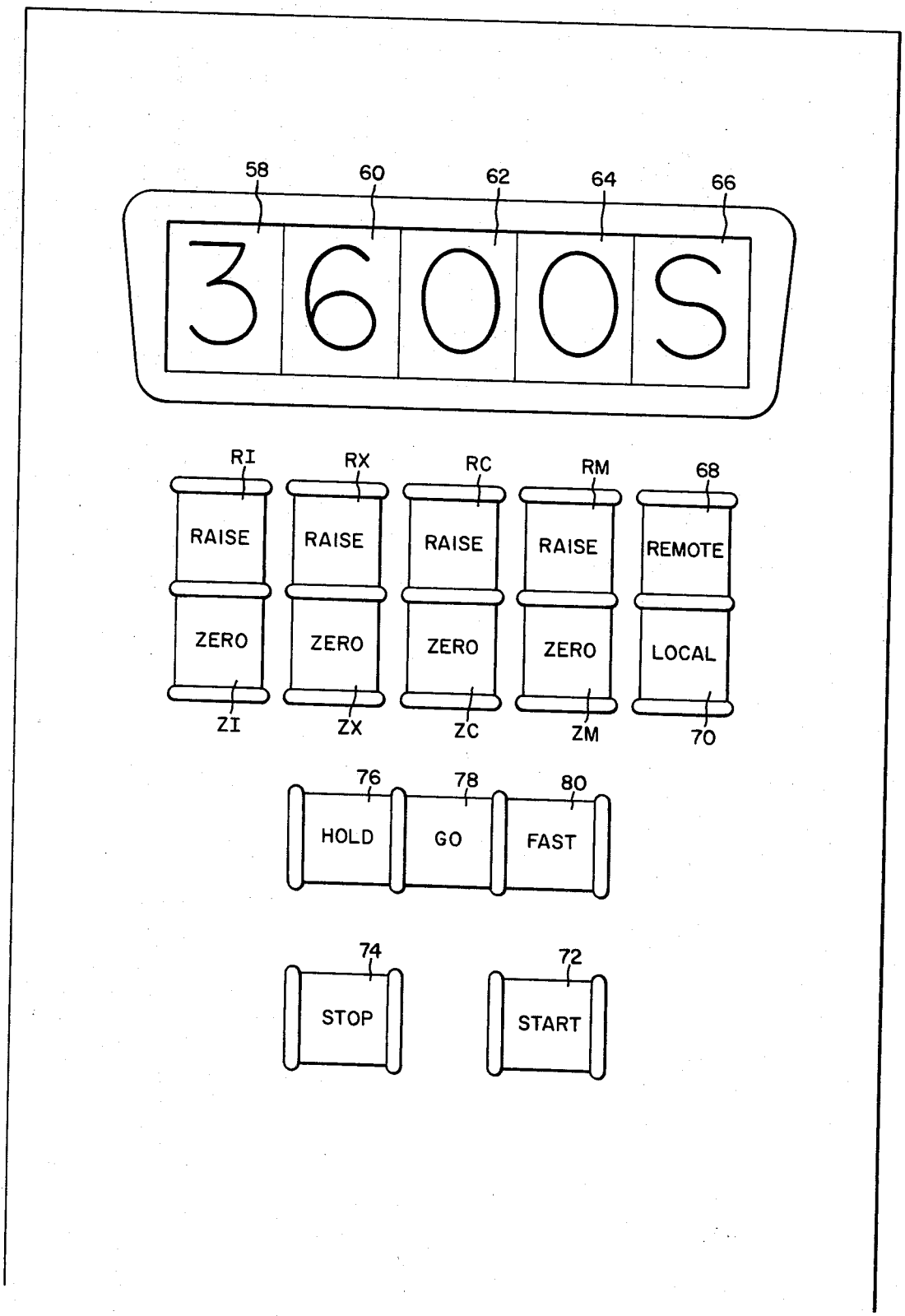

United States Patent Office 3,541,544
Patented Nov. 17, 1970

3,541,544
DIGITAL POTENTIOMETER AND
CONTROL THEREFOR
John F. Reuther, Pittsburgh, Pa., assignor to Westinghouse Electric Corporation, Pittsburgh, Pa., a corporation of Pennsylvania
Filed Aug. 19, 1966, Ser. No. 573,664
Int. Cl. H03k 13/04
U.S. Cl. 340—347    4 Claims

ABSTRACT OF THE DISCLOSURE

A steam turbine digital reference system includes a pulse generator and a counter which increases or decreases its count to match the count in a setter circuit. The counter output is converted into an analog output by a digital potentiometer for use as a load or speed reference in a turbine control system. The counter output is also compared to the setter count in a comparator circuit so as to detect a match between the two counts and thereby provide for holding the counter at the matched count value.

---

This invention relates to digital-to-analog converters, and more particularly to a digital potentiometer which can be preset to give a desired output resistance and, hence, an analog output signal of desired magnitude.

While not limited thereto, the present invention is particularly adapted for use in steam turbine control systems for electrical generators and the like. In the past, such control systems commonly employed manually operated rheostats for setting speed and load conditions. When the turbine automatically stops for one reason or another with a prior art system of this type, it becomes necessary to manually run the potentiometers to zero, and amplifier circuits must be added to the equipment to sense this zero position before latching up the turbine and restarting. Needless to say, this is a somewhat cumbersome and time-consuming process. Furthermore, if systems employing conventional potentiometers are to be adapted to control by automatic load dispatching equipment or control by a computer, special digital-to-analog equipment is required for converting the digital information from the dispatching equipment or computer into an analog signal which can be used to actuate a servomotor which, in turn, drives the mechanical potentiometer.

As an overall object, the present invention seeks to provide a digital potentiometer which overcomes the aforementioned and other disadvantages of mechanical potentiometers as applied to turbine control and the like systems.

Another object of the invention is ot provide a digital potentiometer which operates with improved accuracy and reliability. In this respect, the digital potentiometer of the invention avoids the problems of mechanical wear and nonlinearity inherent in mechanical potentiometers.

A further object of the invention is to provide a digital potentiometer for turbine control and the like systems which is particularly adapted for use in cases where the turbine is controlled by digital automatic load dispatching equipment or by a digital computer.

Still another object of the invention is to provide a digital potentiometer in which the output resistance of the potentiometer is varied as a function of the number of input pulses counted by a counter, and wherein the counter is automatically stopped when the desired count is reached or can be stopped to hold the output voltage indefinitely, even though it has not reached its desired count.

In accordance with the invention, a digital potentiometer is provided with a resistance circuit divided into two equal and series-connected parts supplied by a common voltage source. Individual resistors are interconnected in each part of the circuit and relay contacts are connected across the resistors for resistance control. One of the circuit parts thus provides an output voltage which is a controllable fraction of the source voltage.

Operation equivalent to that of a conventional potentiometer results from the fact that the total circuit resistance is held constant as the resistance of the output circuit part is varied to vary the output voltage. An up-down counter is used with suitable coupling logic to control the relay contacts and the output voltage in accordance with the count in the counter at any point in time. In order to provide equivalency to a motor-operated analog potentiometer, a variable rate pulse generator is connected to the counter to control the counting rate and hence the output voltage variation rate. The control system for the potentiometer itself is completed by a stepping switch or similar speed-load setter and a decimal-binary comparator. In the comparator, decimal information from the stepping switches is compared with binary coded decimal information from the up-down counter. When the count of the counter matches that of the speed-load setter as determined by the aforesaid comparator, the infeed of pulses to the counter is stopped such that the output resistance remains fixed at the desired value as determined by the speed-load setter. However, as the output resistance is changing, the infeed of pulses to the counter can be stopped, if desired, and the output resistance maintained constant until it is again desired to start the counting process from the point at which it was interrupted.

The above and other objects and features of the invention will become apparent from the following detailed description taken in connection with the accompanying drawings which forms a part of this specification, and in which:

FIG. 4 is an illustration of the control panel for the digital potentiometer of the invention as applied to a steam turbine control system;

OVERALL DESCRIPTION OF INVENTION

Figure 1:
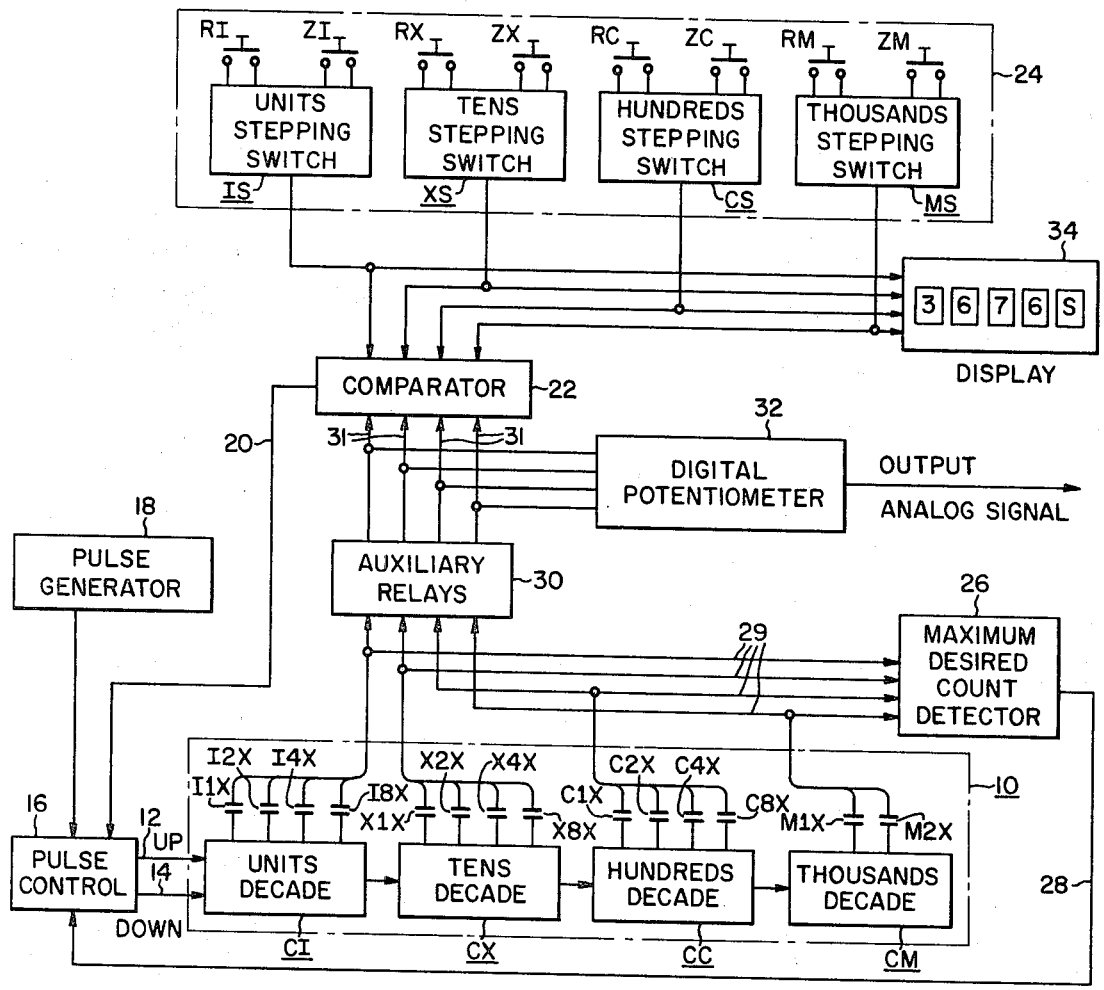
FIG. 1 is an overall block diagram of the digital potentiometer system of the invention.

With reference now to the drawings, and particularly to FIG. 1, the system of the invention includes an up-down counter enclosed by broken lines and identified generally by the reference numeral 10. The counter 10 is of the binary coded decimal type and includes units, tens, hundreds and thousands decades identified as CI, CX, CC and CM, respectively. Each of the decades CI through CM counts in binary to the number nine and then, in the next count, goes to zero and routes the pulse to the next more significant decade. Each of the decades CI through CM, hereinafter described in detail, is formed from reed relay logic modules provided with normally open output contacts which will be open or closed, at any time, depending upon the count stored in the counter. For example, the units decade CI is provided with contacts I1X, I2X, I4X and I8X. The tens decade is provided with four normally open contacts X1X, X2X, X4X and X8X. The hundreds decade CC is provided with a similar set of binary coded contacts identified as C1X through C8X; while the thousands decade CM is provided with only two contacts M1X and M2X since, in this particular embodiment of the invention, the counter need count up to 3999 only.

For purposes of the present discussion and without going into the details of the counter 10, it will be sufficient to state that in accordance with well-known binary notation, the I1X, I2X and I4X contacts will be closed when the units decade has counted up to seven. Similarly, if the counter has counted up to sixty-six, the I2X and I4X contacts will be closed on the units decade CI while the X2X and X4X contacts will be closed on the tens decade CX. In this manner, it will be appreciated that the count of the counter will be represented in binary notation by selected, closed ones of the contacts associated with each of the decades CI through CM.

The counter 10 is adapted to count up or down and is controlled through leads 12 and 14 by a pulse control circuit 16, hereinafter described in greater detail. The pulse control circuit 16, among other things, serves as a switch between a pulse generator 18 and the counter 10. In operation, pulses will be applied to the counter 10 from the pulse generator 18 until a stop or disable signal is applied to the pulse control circuit on lead 20 from a comparator 22, hereinafter described in detail. As will be seen, the comparator compares the count stored in counter 10 with a preset count determined by a speed-load setter circuit, enclosed by broken lines and identified generally by the reference numeral 24. When the count of the counter 10 matches that determined by the speed-load setter, the comparator 22 will produce an output signal on lead 20 to cause the pulse control circuit 16 to disconnect the pulse generator 18 from the counter 10. Hence, the counter 10 will stop counting when its output count matches that determined by the speed-load setter 24. If the numerical value determined by the circuit 24 is above the count of counter 10, the pulse control circuit will cause the counter 10 to count up through lead 12. On the other hand, when the count of counter 10 is above that determined by the speed-load setter 24, the pulse control circuit 16 will cause the counter 10 to count down through lead 14.

Also included in the circuitry is a maximum desired count detector 26, hereinafter described in detail. The detector 26 is connected through leads 29 to the outputs of each of the decades CI through CM and will produce an output signal on lead 28 whenever the count of counter 10 reaches a preset maximum desired value as determined by the circuit 26. Thus, circuit 26 overrides the output of the comparator 22 and stops the infeed of pulses to the counter 10 whenever the maximum desired count is reached.

The contacts on the various decades CI through CM are connected to auxiliary relays 30, there being one relay for each one of the output contacts on the decades CI through CM. The output of the auxiliary relays, corresponding to the count stored in counter 10 is then applied through leads 31 to the comparator 22 as well as to the digital potentiometer 32 itself. The potentiometer 32 will hereinafter be described in greater detail; however for purposes of the present discussion it will be sufficient to state that it converts the switch closures effected by the relays 30 into an analog signal which corresponds in magnitude to the count stored in counter 10.

The speed-load setter circuit 24 includes four stepping switches identified as IS, XS, CS and MS, one for each of the decades in the counter 10. Each of the stepping switches is provided with a raise pushbutton RI, RX, RC and RM, respectively. As will be seen, any one of the stepping switches can be advanced to a selected digit in the units, tens, hundreds or thousands decade by a corresponding number of depressions of its associated raise pushbutton. In order to "zero" any one of the stepping switches, a second pushbutton Z1, ZX, ZC or ZM is depressed to "home" or return the stepping switch to its position where its output is at zero.

The digits stored in the respective stepping switches IS, XS, CS and MS are displayed on a display device 34. As was mentioned above, the present invention is particularly adapted for use in the control of a steam turbine wherein two factors are to be controlled, either speed or load. On the display device 34, the letter "S" indicates that speed is being controlled, and the number 3676 indicates that the speed of the turbine should be 3676 revolutions per minute. If the load is being controlled, the "S" would switch to an "L," indicating that the output load of the generator is now being controlled rather than speed.

DIGITAL POTENTIOMETER

Figure 2:
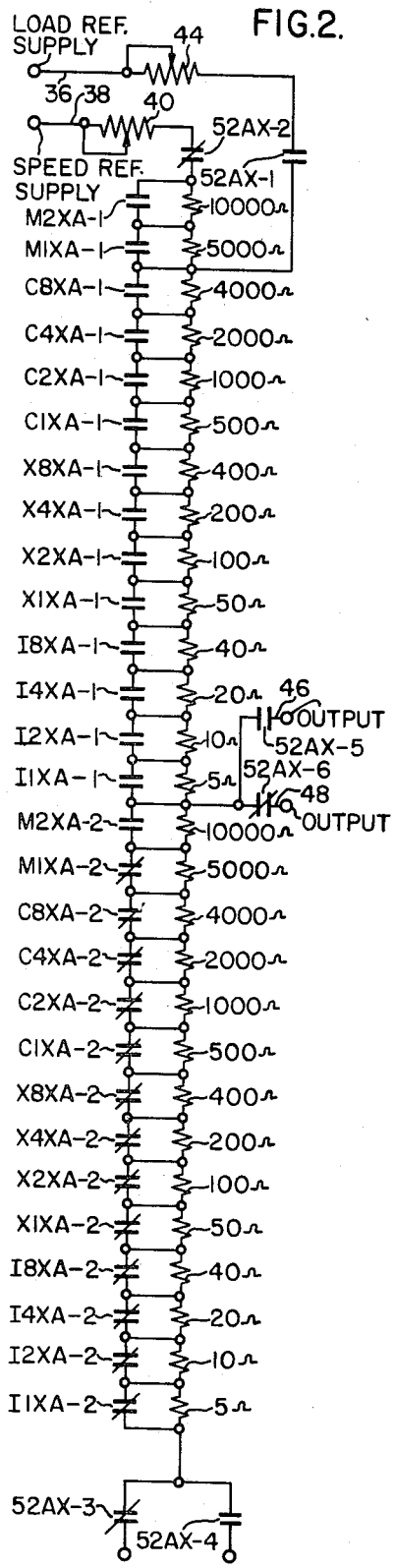
FIG. 2 is a circuit diagram of the potentiometer itself.

With reference now to FIG. 2, the potentiometer itself is shown and comprises a plurality of series-connected resistors having the contact of an associated one of the auxiliary relays 30 of FIG. 1 in shunt therewith. The potentiometer is supplied with two sources of energizing voltage, one of which is applied to lead 36 and the other of which is applied to lead 38. That applied to lead 36 comprises the load reference supply voltage; whereas that applied to lead 38 comprises the speed reference supply voltage.

The lead 38, for example, is connected through a variable calibrating resistor 40 to the upper end of series-connected resistors identified by their respective resistance values above and below the center tap 42 of the series string. The low potential side of the resistor 40 is connected through contacts 52AX–2 of a relay, not shown, to the upper end of the series string of resistors. In a similar manner, the lead 36 is connected through a load calibrating variable resistor 44 and normally open contacts 52AX–1 of the aforesaid relay to the junction of the 4000 and 5000 ohm resistors in the series string above the center tap 42. The lower end of the series string of resistors is likewise provided with parallel paths containing normally open and closed contacts 52AX–3 and 52AX–4. When speed is to be controlled, for example, the contacts of the relay 52AX will be in the respective closed and open positions shown such that lead 38 is connected to the upper end of the series string of resistors. On the other hand, when the output load is to be controlled, the positions of the contacts will be reversed such that the lead 36, having the load reference supply voltage thereon, will be connected to the junction of the 4000 and 5000 ohm resistors above the center tap 42. Contacts 52AX–5 and 52AX–6 of the relay 52AX are also included in output leads 46 and 48, the lead 48 being connected to the speed control system for the turbine, while the lead 46 is connected to the load control system.

It will be noted that for each resistor above the center tap 42, there is a resistor of corresponding value beneath the center tap. The contacts in shunt with the respective resistors are associated with the auxiliary relays 30 of FIG. 1, there being fourteen contacts above and below the center tap 42 corresponding to the fourteen contacts at the outputs of the decades CI through CM. Note that the contacts above the center tap 42 are normally open, while those below the center tap are normally closed. Thus, with the contacts in the positions shown, all of the resistors above the center tap will be connected into the circuit while all of those below will be shorted out such that the potential on the center tap 42 will be at its maximum positive value. Whenever a set of relay contacts above the center tap 42 closes, a corresponding set of contacts beneath the tap 42 opens. Thus, as the counter counts up, the output tap 42 is raised above the common or ground voltage at the lower end of the series string in 5-ohm steps for a possible maximum total of 3999 steps.

In this respect, it will be noted that the values of the resistors above and below the center tap 42 are binary coded. Thus, the first resistor above the center tap 42 has a value of 5 ohms, the second resistor has a value of 10 ohms or twice that of the first resistor; the third resistor has a value of 20 ohms or four times that of the first resistor; and the fourth resistor has a value of 40 ohms or eight times that of the first resistor.

Let us take, for example, the units decade CI and assume that the count in the units decade is 9, meaning that the I8X and I1X contacts are closed. Consequently, the I8XA–1 contacts and the I1XA–1 contacts above the center tap 42 will now be closed, thereby shorting out a resistance equal to 45 ohms or nine times the base value. At the same time, the normally closed contacts I1XA–2 and I8XA–2 below the center tap 42 will open upon energization of the aforesaid two auxiliary relays, the overall effect being that a net resistance of 45 ohms has been switched into the circuit below the center tap 42 while a resistance of 45 ohms has been switched out of the circuit above the center tap.

Since contacts are used in the potentiometer of FIG. 2, to limit the rate of change, the complete reference system can be isolated and voltage summing may be used in the control for the turbine or other equipment, making it easier to adjust amplifier gain in the speed loop for the turbine. Also, since contacts are used, run-back is easily and quickly accomplished by simultaneously resetting the counter relays. That is, there is no time delay as in a conventional mechanical rheostat where it is necessary to manually move the tap from one position to another over a period of time.

SPEED-LOAD SETTER

Figure 3:
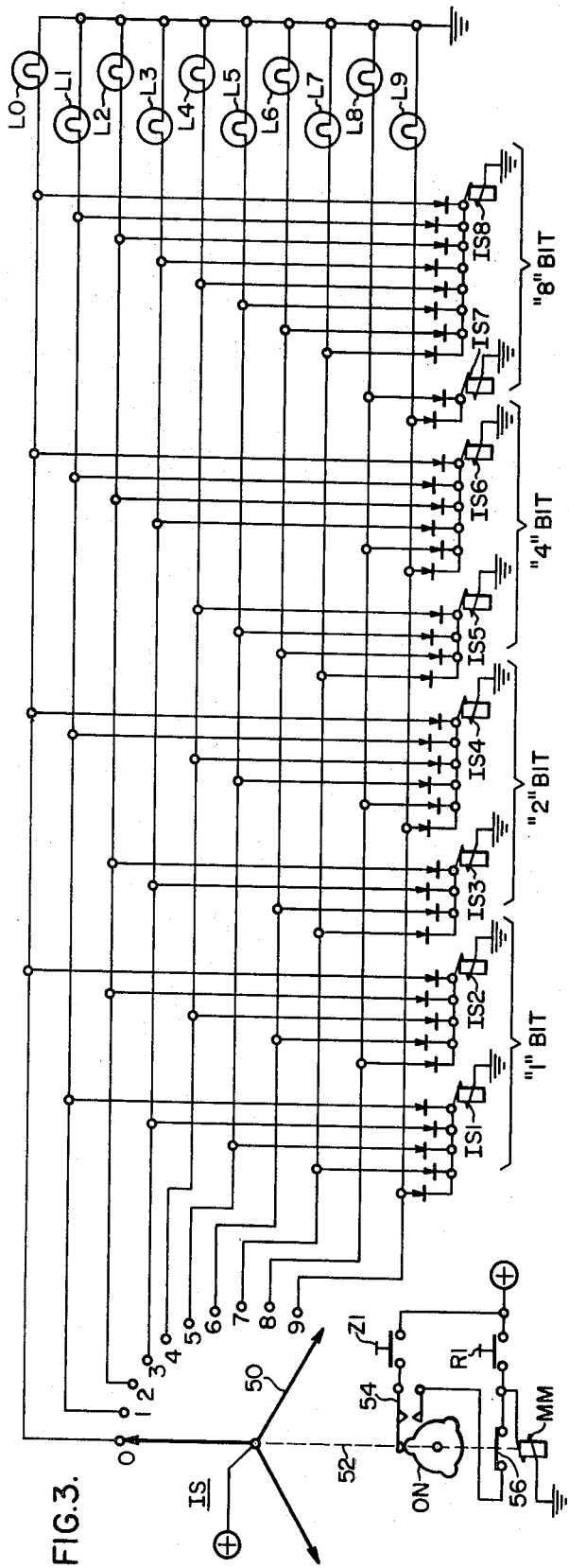
FIG. 3 illustrates one of the stepping switch arrangements utilized for setting a particular resistance value into the digital potentiometer of the invention.

With reference now to FIG. 3, the units stepping switch arrangement IS of the speed-load setter 24 is shown, it being understood that the remaining stepping switches XS, CS and MS are identical in construction. The stepping switch includes a bank of contacts numbered 0 through 9, together with a three-arm wiper brush 50 which is adapted to be rotated in a clockwise direction by means of a motor magnet MM. The motor magnet MM is connected to the wiper brush 50 through a ratchet-type device schematically illustrated by the broken line 52, such that upon energization of the motor magnet, it will advance the wiper brush 50 through one step. Thus, if the motor magnet is energized, the wiper brush will advance from the "0" contact to the "1" contact. When it is again energized, it will advance from the "1" contact to the "2" contact, and so on. The motor magnet MM is energized by means of the pushbutton RI previously described in connection with FIG. 1.

After the wiper brush has been advanced through ten steps, the next counterclockwise arm of the wiper brush will be on the "0" contact preparatory to a succeeding cycle of operation. If it is desired to "zero" or "home" the stepping switch at will such that the wiper brush assumes the position shown in FIG. 3 where one arm is on the "0" contact, the pushbutton ZI is depressed and held in that position. Whenever the wiper brush 50 is not on the "0" contact, the contacts 54 associated with an off-normal cam ON will be closed. The cam ON is provided with three projections such that the contacts 54 will open only when one of the three arms on the wiper brush 50 is on the "0" contact. Assuming that an arm of the wiper brush 50 is not on "0" and that contacts 54 are closed, depression of pushbuttton ZI will energize the motor magnet MM through normally closed contacts 56 which open and then close each time the wiper brush is advanced through one step. Thus, the contacts 56 serve to interrupt and, in effect, supply pulses to the motor magnet MM such that it will rotate in a clockwise direction until the contacts 54 open. At this point, an arm of the wiper brush will be on the "0" contact and the motor magnet MM will no longer be energized.

If desired, circuitry may be provided for automatically zeroing the thousands, hundreds, tens and units stepping switches one after the other. This feature, not shown herein, can be used, for example, to zero all units in run-back after automatic stop of the turbine or other device to be controlled.

DIGITAL DISPLAY

The contacts numbered 0 through 9 are each connected to an associated one of the lamps L0–L9 shown in FIG. 3. Preferably, the lamps L0–L9 are incorporated into a digital display unit of the type manufactured by Industrial Electronic Engineers, Inc. and identified as their Series 10,000. In that unit, the light from each one of the lamps L0–L9 is passed through an associated mask representing the number to be displayed and thereafter focused onto a screen where it may be viewed by the operator. With this arrangement, all digits can appear on the screen one at a time, and are of uniform size and intensity. Of course, other types of display arrangements may be employed, such as neon tubes, wherein the outline of the respective digit is illuminated such that it may be viewed from the front of a tube containing the digits.

With reference, now, to FIG. 4, the face of the digital display 34 is shown in detail. The screens of the four digital display units for the respective stepping switches are identified by the numerals 58, 60, 62 and 64. As was explained in connection with FIG. 1, there is a fifth display unit 66 which, in the particular embodiment of the invention shown herein, is used to signify whether the load or speed of a turbine is being controlled. In FIG. 4, the letter "S" appears on the screen 66, signifying that speed is being controlled. Thus, under the conditions assumed, the contacts of a relay 52AX will be in the positions shown in FIG. 2. If, however, load is to be controlled, the display on screen 66 will change to an "L" and the conditions of the contacts in FIG. 2 will also be reversed.

The raise and zero pushbuttons for the respective stepping switches are identified by the same reference numerals as used in FIG. 1. In addition to these pushbuttons, there are an additional two pushbuttons 68 and 70. When pushbutton 70 is depressed, the turbine or other equipment to be controlled is under local control, meaning that the operator sets the desired speed or load by successive depressions of the pushbuttons RI through RM. On the other hand, if it is desired to control the turbine or other equipment by means of automatic load dispatching equipment for a power control system or by means of a computer, the remote pushbutton 68 will be depressed. Under these conditions, none of the pushbuttons shown in FIG. 4 will be utilized. The pulses for driving the motor magnets MM of the various stepping switches will then be applied from the computer or remote control system, as the case may be, which pulses will be applied in shunt with the pushbutton RI shown in FIG. 3, for example. Thus, it will be appreciated that the system is adaptable either to local control or remote control, depending upon conditions. In addition to the pushbuttons just described, there is a start pushbutton 72 and a stop pushbutton 74, the functions of which will hereinafter be explained. Finally, there are three further pushbuttons 76, 78 and 80, the functions of which will also hereinafter be explained.

In the particular embodiment of the invention shown herein, the leads connecting the contacts numbered 0 through 9 to the lamps L0 through L9 (FIG. 3) are also connected to relay coils IS1 through IS8. The digital output of the stepping switches IS through MS is in decimal form; and this output must be compared with binary coded decimal digital information from the counter 10. In the comparison process, the relay coils IS1 and IS2 represent the "1" bit in a binary number; the relay coils IS3 and IS4 represent the "2" bit; the relay coils IS5 and IS6 represent the "4" bit; and relay coils IS7 and IS8 represent the "8" bit. It will be noted that each of the relay coils IS1–IS8 is adapted to be energized by contact of wiper brush 50 with any one of a plurality of contacts on the stepping switch bank, and that those contacts which cannot energize relay coil IS1, for example, do energize the relay coil IS2. Regardless of which one of the contact points is engaged by the wiper brush 50, one or the other of the two relays in the "1" bit, the "2" bit, the "4" bit and the "8" bit pairs will be energized while the other is deenergized. In other words, one relay in each pair will always be energized, but the two relays in each pair will never be energized at the same time. As will be seen, the contacts on the relay coils IS1 through IS8 are utilized in combination with contacts on the auxiliary relays 30 in the comparator 22.

DECIMAL-BINARY COMPARATOR

Figure 5:
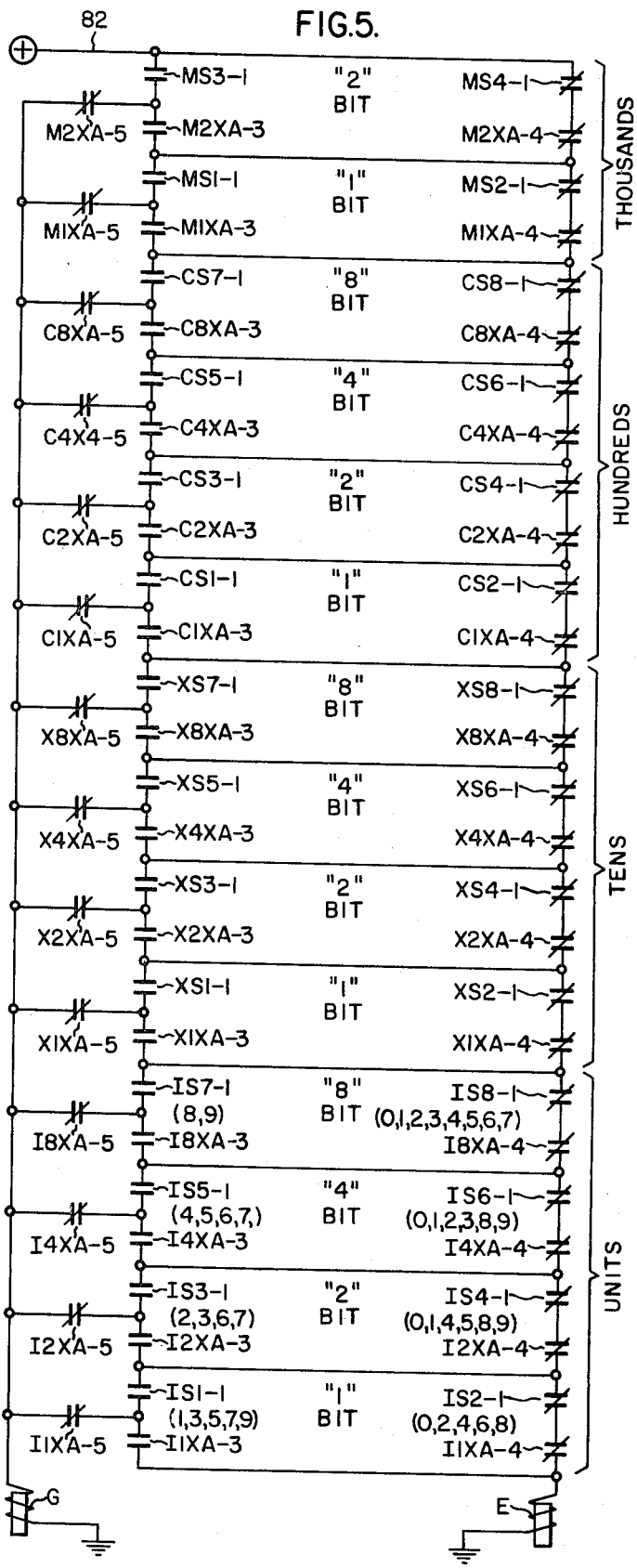
FIG. 5 is a schematic circuit diagram of the comparator of FIG. 1 for comparing binary coded information from a counter with decimal coded information from the speed-load setter of the invention.

With reference, now to FIG. 5, the comparator 22 comprises contacts of the auxiliary relays 30, contacts of the "bit" relays for each of the stepping switches IS through MS, and two sensing relays G and E. When relay G is energized, it means that the desired value as determined by the speed-load setter is greater than the count of counter 10 and that more pulses are needed from the pulse generator 18. On the other hand, relay E becomes energized when the value set by the speed-load setter 24 equals the count stored in counter 10. When both relays are deenergized, the count established by the speed-load setter is less than that stored in counter 10 meaning that the counter should count down.

In the operation of the device, we first examine the most significant digit. The scheme resembles a ladder in which power comes into the top rung of the ladder via lead 82. If the speed-load setter 24 is set at "1" and the counter is at "0," the G relay will be energized. However, if the setter is at "0" and the counter is at "1," both relays G and E will be deenergized. Now, if they are both "ones" or both "zeros," power will get down to the next rung of the ladder and we must examine the next bit in the same way. When the counter has counted to the point where it equals the value set by the speed-load setter 24, power will get down through all rungs of the ladder and relay E will pick up, indicating that the two values are equal. Thus, from the conditions of relays G and E we are able to tell whether the counter should count up, count down or stop, without the operator making this choice.

In FIG. 5 it can be seen that the ladder forming the comparator includes a units section, a tens section, and a hundreds section, each rung of the ladder in each section representing a "1," "2," "4" or "8" binary bit. The thousands sections, however, includes only two rungs representing a "1" bit and "2" bit since, as mentioned above, it is necessary to count to a maximum of 3999 only. The contacts shown on the ladder of FIG. 5 are those from relay coils IS1 through IS8 for the stepping switch IS as well as those for corresponding relays on the stepping switches XS, CS and MS. Contacts from the auxiliary relays 30 corresponding to the contacts on the decades CI through CM of counter 10 are also included on the latter. Note that the contacts on the right side of the ladder are all normally closed, while those on the left side are all normaly open. In addition, there are additional contacts I1XA–5, I2XA–5, I4XA–5, etc. which connect the left side of the ladder to the relay G. These contacts are normally closed as shown.

The contacts associated with the output relays for the stepping switches on the right side of the ladder represent those numbers from 0 through 9 in which the bit of a particular rung of the ladder is not included. Those on the lefthand side, on the other hand, are those which do include the bit. Let us take, for example, the "1" bit in the units section. The IS1–1 contact will close whenever the value stored by the first stepping switch IS is 1, 3, 5, 7 or 9, all of which digits includes a "1" bit. The IS2–1 contact on the other side of the ladder, however, will open whenever the number stored by the stepping switch IS is 0, 2, 4, 6 or 8, none of which include a "1" bit. The remaining bit rungs of the ladder operate in the same manner.

When the value stored in the speed-load setter 24 is zero and the count of the counter is also zero, the contacts will be in the positions shown in FIG. 5. Consequently, current will flow from the positive terminal 82 through all of the closed contacts on the right side of the ladder to energize relay E. Let us assume, now, that a value equal to 3676 is entered into the various stepping switches IS through MS. The units digit, being 6, means that the "2" bit and the "4" bit in the units section will come into play. Specifically contacts IS4–1 and IS6–1 will open while contacts IS3–1 and IS5–1 close. Since the tens digit is now 7, the "1," "2," and "4" bits will come into play with the result that contacts XS2–1, XS4–1 and XS6–1 will open while contacts XS1–1, XS3–1 and XS5–1 will close. The hundreds digit, being the same as the units digit, will bring the "2" and "4" bits into play. Consequently, contacts CS4–1 and CS6–1 will open while contacts CS3–1 and CS5–1 close. Finally, since the thousands digit is 3, both bits in the thousands section come into play, meaning that contacts MS2–1 and MS4–1 are now open and contacts MS1–1 and MS3–1 are closed.

Closure of contacts MS3–1 applies power through the normally closed contacts M2XA–5 to the relay G to cause it to become energized. At this point, therefore, the relay G will actuate the pulse control circuit 16 to feed pulses from generator 18 to the counter 10. When the counter reaches the desired count of 3676, all of the contacts in the series I1XA–5, I2XA–5, etc., which would otherwise supply power to relay G, are open; and power is again supplied to the relay E.

In the example given, and assuming that the counter has reached a count of 3676, current will flow through the left-hand side of the "2" bit and "1" bit rungs in the thousands section, thence across the ladder to the right side of the "8" bit in the hundreds section, thence back to the left side and down past the "4" and "2" bits in the hundreds section, thence back across the ladder and down the right side of the "1" bit in the hundreds section and the "8" bit in the tens section. Since contact XS6–1 is now open, the current must again pass over to the left side of the ladder where it passes downwardly past the "4," "2" and "1" bits in the tens section. At this point, the current again shifts to the right side of the ladder past the "8" bit of the units sections, thence over to the left side of the "4" and "2" bits in the units section, and finally back to the right side of the "1" bit of the units section to the relay E.

From the foregoing, it will be understood that the comparator 22 compares binary coded decimal signals from the speed-load setter 24 with binary coded decimal signals from the counter 10 and, among other things, produces an output signal whenever the numerical values of the binary coded decimal signals coincide.

While the relay coils IS1 through IS8 associated with stepping switch IS, for example, have been shown herein for purposes of explanation, in an actual installation these relays will usually be replaced by additional banks of contacts on the stepping switch. In this respect, the wiper brush of a succeeding bank on switch IS could replace one side of the contacts IS1–1 shown in FIG. 5, while the other side of the contacts IS1–1 could be served by contact points 1, 3, 5, 7 and 9 interconnected on the bank for that particular wiper brush.

UP-DOWN COUNTER

Figure 6:
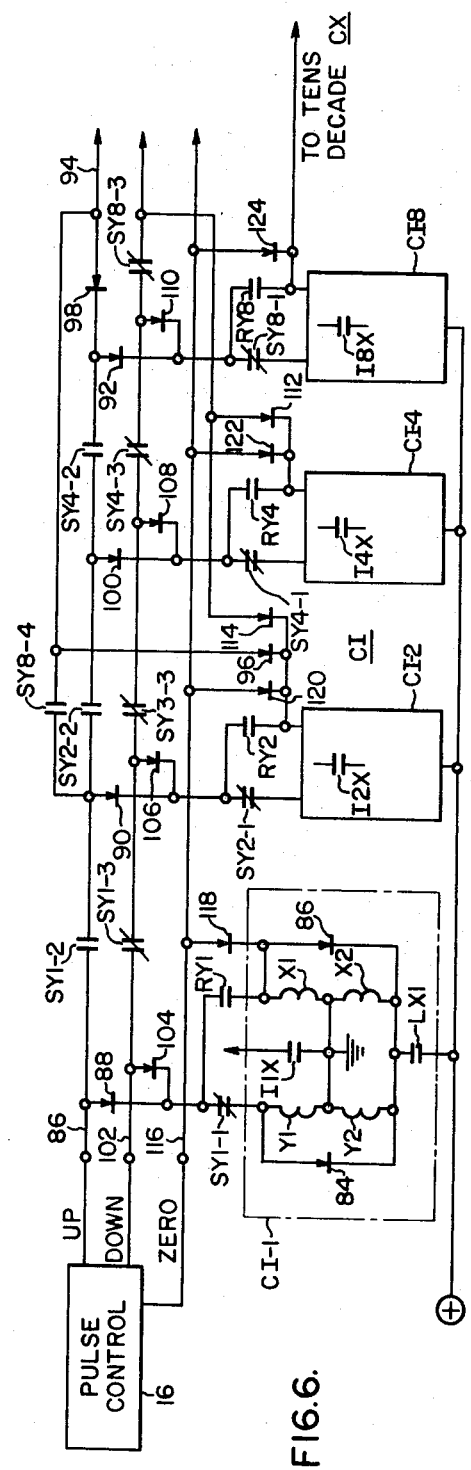
FIG. 6 is a schematic circuit diagram of one decade of the up-down counter of the invention.

With reference now to FIG. 6, the units decade of the up-down counter 10 is shown, it being understood that the tens, hundreds and thousands decades are identical in construction. Each decade is made up of four flip-flop modules identified as CI–1, CI–2, CI–4 and CI–8. The modules are of the type employing reed relays wherein two flexible reeds within a glass or the like tube are surrounded by a center tapped coil. When current flows through both sides of the coil to the center tap, the magnetic flux patterns produced on opposite sides of the center tape buck each other whereby the reed contacts remain open. On the other hand, when current flows through only one side of the center tapped coil, the contacts engage or close.

In FIG. 6, the module CI–1, for example, is provided with two such reed relays. The portions of the winding on either side of the center tap for one relay are identified as Y1 and Y2, while the portions of the winding on either side of the center tap for the other relay are identified as X1 and X2. The center taps of both relays are connected to ground as shown, and the coils for the respective reed relays are provided with shunt blocking diodes 84 and 86. Contacts I1X, which are the output contacts shown in FIG. 1, are associated wtih the coils X1 and X2 and will be closed when a count of "1" is stored in the counter. Similarly, contacts I2X, I4X and I8X will be closed when a count incorporating the bit "2," "4" or "8" is stored in the counter.

When it is desired to count up, pulses are applied from the pulse control circuit 16 to lead 86. The first pulse will pass through diode 88 to the first module CI–1 only since, at this time, the contacts SY1–2, SY2–2 and SY4–2 are open. When the pulse passes through diode 88, it will also pass through normally closed contacts SY1–1 of the left reed relay and will energize both coil halves Y1 and Y2 of the left reed relay. Consequently, the SY1 contacts will remain in their previous closed condition. However, the current will also flow through the lower coil half X2 of the right reed relay, thereby causing output contacts I1X and latching contacts LX to close. Closure of contacts I1X, of course, indicates that a "1" bit is stored in module CI–1. With contacts LX closed, energizing is applied to the circuit even though the pulse disappears on lead 86. However, the lower coil halves Y2 and X2 are the only ones now energized. The result is that contacts SY1–1 and RY, both associated with the left reed relay, change their positions; while the contact LX remains closed. When the next pulse passes through the diode 88, both coil halves X1 and X2 are energized since contacts RY are closed, opening the contact LX. When the input pulse disappears, the unit returns to its normal state with contacts SY1–1 closed, contacts RY open and contacts LX open.

When the first pulse was received as aforementioned, not only did the contacts SY1–1 open; the contacts SY1–2 also closed. Consequently, the next or second pulse not only serves to switch the first module CI–1 back to its original state but also passes through diode 90 and contacts SY2–1 to switch module CI–2.

The operation of the circuit can best be understood from a consideration of the following binary notation:

| \"8\" | \"4\" | \"2\" | \"1\" | |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 0 | 0 | 0 | 0 | 0 |

Binary bits

In the foregoing notation, it should be remembered that whenever a "one" appears in the "1" bit column for a digit, the contacts SY1–2 will be closed; whenever a "one" appears in the "2" bit column, the contacts SY2–2 will be closed; and whenever a "one" appears in the "4" bit column, the contacts SY4–2 will be closed. From an analysis of the foregoing table, it will be appreciated that in counting up in binary, a digit will change if all less significant digits are a "one"; while in counting down, a digit will change if all less significant digits are "zero." Thus, on the fourth pulse, for example, contacts SY1–2 and SY2–2 will be closed as shown in the foregoing table whereby the pulse will be applied to all of the modules CI–1, CI–2 and CI–4 to change their stable states, the module CI–4 now being "ON" while modules CI–1 and CI–2 are "OFF." This process will continue until the seventh pulse is received, whereupon all of the contacts SY1–2, SY2–2 and SY4–2 are closed. The next succeeding or eighth pulse will now pass through all of these closed contacts and diode 92 to switch the stable state of the module CI–8. When module CI–8 switches stable states, contacts SY8–4 close. However, contacts SY1–2 are now open such that the next succeeding or ninth pulse will simply switch the stable state of module CI–1. On the tenth pulse, however, contacts SY1–2 will be closed as will the contacts SY8–4. This tenth pulse, therefore, passes through contacts SY1–2 and SY8–4 to lead 94 and the next succeeding tens decade CX. The pulse also passes through diode 96 and diode 98 to reset the CI–2 and CI–8 modules whereby all modules are "OFF" as shown in the aforementioned table, and we are again ready to begin counting from zero. The pulses are applied from lead 86 to the module CI–4 through diode 100.

Similarly, in counting down, pulses are applied to lead 102 and fed to the respective modules through diodes 104, 106, 108 and 110. In this process, and assuming that the counter has a count of ten stored therein, all of the contacts SY1–3 through SY8–3 will be closed and the first pulse will be applied through diodes 112 and 114 to the modules CI–2 and CI–4 such that modules CI–1 and CI–8 will be "ON" while the remaining two are "OFF," which in binary notation signifies a count of nine. In order to reset all of the modules and, hence, reset the counter to zero, a pulse is applied to the right-hand side of each module via lead 116 and diodes 118, 120, 122 and 124.

In the foregoing fashion, different combinations of closures of contacts I1X, I2X, etc. will indicate a binary number which is compared with the digital information from the stepping switches in comparator 22 to produce a control signal on lead 20.

MAXIMUM DESIRED COUNT DETECTOR

Figure 7:
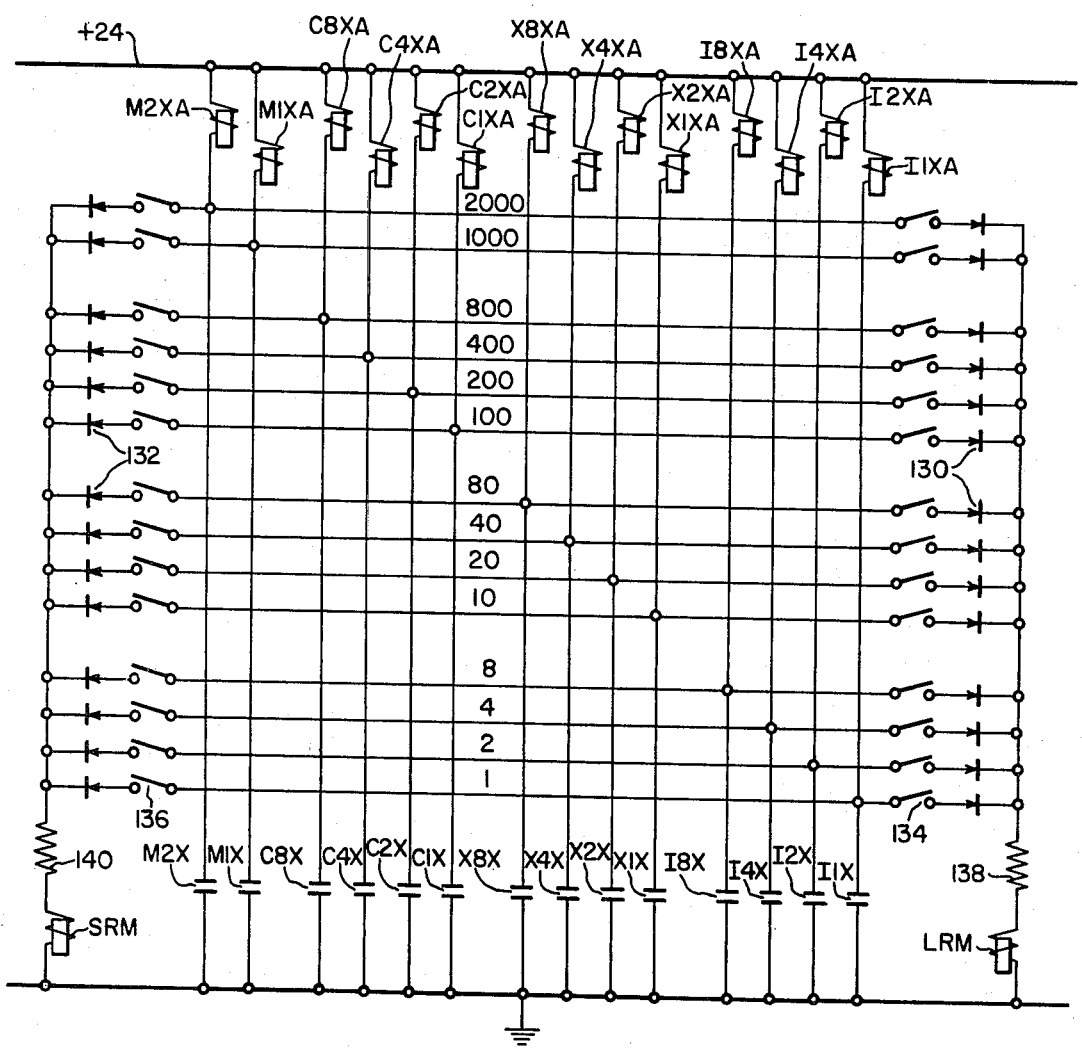
FIG. 7 is a schematic illustration of the maximum desired count detector of the invention.

With reference now to FIG. 7, the maximum desired count detector 26 is shown. It includes the contacts I1X, I2X, I4X, etc. in series with an associated one of the auxiliary relays 30 which are identified as I1XA, I2XA, I4XA, etc. in FIG. 7. Adapted for connection to the junctions of the respective counter contacts and their associated auxiliary relays are two sets of diodes 130 and 132. Any one of the diodes 130 can be connected to an associated one of the junctions between a counter contact and an auxiliary relay by closing a selected one of the switches in the group 134. Similarly, any one of the diodes 132 can be connected to an associated junction between a counter contact and an auxiliary relay by closing a selected one of the switches in the group 136.

Assuming, again, that the invention is utilized in a steam turbine control system, the maximum count detector is utilized to avoid having the counter 10 count too high by mistake. Two upper limit relays, one for speed (i.e., relay SRM) and one for load (i.e., LRM) are connected through resistors 138 and 140, respectively, to the cathodes of the parallel diodes 130 and 132.

In operation, if it is desired to count up to a maximum of 800, the switches in the groups 134 and 136 associated with the C8X contact are closed. This will cause the relays SRM and LRM to become energized through the diodes and the relay coil C8XA. As the counter begins to count up, various ones of the counter contacts will close; however they will have no effect until the count of 800 is reached, whereupon the C8X contact closes, thereby shorting out the relays SRM and LRM. It will be appreciated, of course, that various combinations of switches can be closed for any desired count with the same overall effect. For example, if the desired maximum count is 884, the switches in groups 130 and 132 associated with the C8X, X8X and I4X contacts will be closed. Until this combination of closed contacts is reached, the relays SRM and LRM will remain energized through at least one circuit which contains an open contact. However, when the count of 884 is reached, all of the contacts to which the closed switches in groups 130 and 132 are connected will be closed, thereby again shorting out the relays SRM and LRM, whereupon the count of the counter will stop in the manner hereinafter described.

PULSE CONTROL

Figure 8:
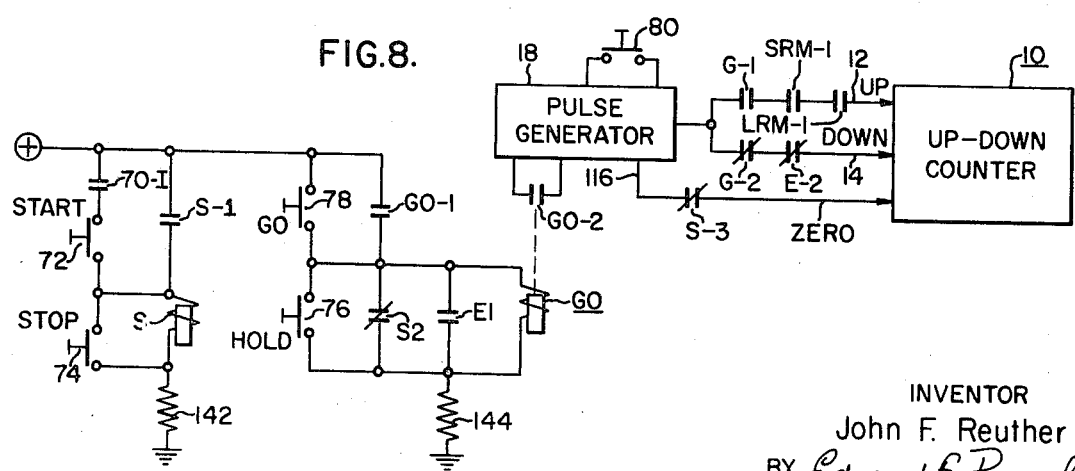
FIG. 8 comprises a schematic circuit diagram of the pulse control circuitry of the invention.

The control system for the digital computer of the invention is shown in FIG. 8 and will be considered in conjunction with the control panel shown in FIG. 4. Assuming that the local pushbutton 70 is depressed, the contacts 70–1 in FIG. 8 will be closed. In order to initiate a digital-to-analog conversion, the start pushbutton 72 is depressed, whereupon master relay S will become energized through resistor 142. When relay S becomes energized, it is held energized by holding contacts S–1 until the stop pushbutton 74 is depressed so as to short out the relay S.

When relay S becomes energized, it opens normally closed contacts S–2 in shunt with a "go" relay GO. Thus, after the master relay S is energized, the speed-load setter 24 can be set as desired by the pushbutton RI–RM as described above. After the speed-load setter 24 is set at the desired value, the "go" pushbutton 78 is depressed, whereupon the relay GO is energized through resistor 144. When relay GO becomes energized, its holding contacts GO–1 close and remain closed until the hold pushbutton 76 is depressed to deenergize the relay GO. When relay GO became energized, contacts GO–2 on the pulse generator 18 also closed, thereby turning on or enabling the pulse generator to produce output pulses.

Assuming that the desired count has been set into the speed-load setter 24 and that the counter 10 has not as yet begun to count up, the relay G of FIG. 5 will be energized. Consequently, contacts G–1 in FIG. 8 will now close; and since the maximum desired count has not been reached, the relays SRM and LRM of FIG. 7 are also energized to close the contacts SRM–1 and LRM–1 in FIG. 8. Therefore, pulses will now be fed through the "up" lead 12 to the up-down counter 10 whereby the counter will start counting up from zero.

This action will continue until the count set by the speed-load setter 24 is reached, whereupon relay G will become deenergized and relay E will become energized. Deenergization of relay G opens contacts G–1, while energization of relay E closes contacts E–1 shown in FIG. 8 to short out the relay GO. Consequently, pulse generator 18 now stops and is disconnected from the counter 10 by virtue of the opening of contacts G–1. The counter 10, however, has the desired count stored therein, the output of the potentiometer of FIG. 2 comprising an analog signal corresponding in magnitude to the desired count. Note that during the counting-up process, the contacts G–2 are open such that no pulses are applied to the counter through lead 14. At any time during the counting-up process, the hold pushbutton 76 may be depressed to stop the counting process, which may again be initiated by depressing the "go" pushbutton 78. It will also be appreciated that protective relaying devices can be provided with contacts in shunt with the GO relay to stop the counting process because of emergency conditions. In the case of a turbine control system, for example, such emergency conditions may comprise actuation of a circuit breaker or other off-normal conditions.

Let us assume, now, that the count established by the speed-load setter 24 is less than that of the counter. Under these circumstances, the relays G and E of the compartor 22 of FIG. 5 will both be deenergized. Thus, contacts G–2 and E–2 in FIG. 8 will be closed to pass pulses from the pulse generator 18 to the up-down counter 10 via lead 14. The counter 10 will now count down until the count of the counter matches that stored in the speed-load setter 24, whereupon relay E of FIG. 5 will become energized to open contacts E–2 and stop the counting process.

A "zero" pulse for resetting all of the decades in the counter 10 is supplied through lead 116, also shown in FIG. 6. The lead 116 has normally closed contacts S–3 of master relay S included therein such that these contacts will be open whenever the start pushbutton 72 is depressed. However, when the stop pushbutton 74 is depressed, contacts S–3 will close to automatically pass a reset pulse to the counter whereby all decades are automatically reset to zero. As will be understood contacts of other relays may be provided in shunt with contacts S–3 shown in FIG. 8 for the purpose of resetting the counter under special conditions.

Finally, it is evident that all of the foregoing control functions may be supplied by a digital computer or by means of automatic load dispatching equipment in the case of a turbine control system for an electrical generator. In this case, depression of the remote pushbutton 68 of FIG. 4 will serve to replace the various manual controls shown herein by automatic control functions.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A system for converting digital information in the form of electrical pulses into an analog output signal, said system comprising a pulse counter, a pulse generator for supplying pulses to said counter, switching circuitry coupled from the output of said pulse generator to the input of said counter to control the infeed of pulses from said pulse generator to said counter, means for generating a predetermined desired count including one stepping switch for each digit of the predetermined desired count, means for feeding pulses to each stepping switch for the purpose of advancing the count generating output of each stepping switch to the correct digit in the predetermined desired count, comparator circuitry for comparing the count of said counter with the predetermined desired count, means for coupling the stepping switch outputs to said comparator circuitry, means responsive to the comparator circuitry for causing the switching circuitry to stop the infeed of pulses to the counter when the count of the counter matches said predetermined desired count, a resistance circuit having resistors connected therein in a predetermined pattern, means for applying a source of voltage across said resistance circuit, means for coupling said counter to said resistance circuit to produce resistance variation as said counter counts, and means connected to a predetermined point of said resistance circuit for deriving an analog output signal as a function of the count in said counter.

2. The system of claim 1 wherein the means for feeding pulses to each stepping switch comprises an energizing circuit having a pushbutton switch which is manually depressed by an operator a number of times equal to the desired digit.

3. The system of claim 1 including first and second comparator relays and wherein said counter is provided with sets of output circuit making and breaking means which are open or closed depending upon the count of the counter and said stepping switch output coupling means are also provided with output circuit making and breaking means which are open or closed depending upon the count stored in the stepping switches, the comparator comprising a ladder network in which energizing current to said first and second comparator relays is controlled by the output circuit making and breaking means of said counter and said stepping switch output coupling means, one of said relays being energized when the count of the counter is below said predetermined desired count, the other of the relays being energized when the count of said counter is equal to said predetermined desired count, and both of said relays being deenergized when the count of said counter is above said predetermined desired count.

4. The system of claim 3 in which said ladder network comprises two parallel current paths either of which can conduct energizing current to either of said relays, and a plurality of conductors interconnecting said current paths at spaced points along their lengths, the contacts of said stepping switch output coupling means and said counter being in said current paths.

References Cited

UNITED STATES PATENTS

| | | | |
|---|---|---|---|
| 2,700,750 | 1/1955 | Dickinson | 340—347 |
| 3,124,794 | 3/1964 | Patmore | 340—347 |
| 3,034,033 | 5/1962 | Fath et al. | 235—92 |
| 3,098,995 | 7/1963 | Mundt | 235—177 |
| 3,273,143 | 9/1966 | Wasserman | 340—347 |
| 3,310,800 | 3/1967 | Havens | 235—177 |
| 3,327,178 | 6/1967 | Deeg | 317—140 |
| 3,376,428 | 4/1968 | Nugent | 235—92 |
| 3,379,863 | 4/1968 | Werts | 235—92 |

MAYNARD R. WILBUR, Primary Examiner

C. D. MILLER, Assistant Examiner